US012620632B2

(12) United States Patent
 Cui et al.

(10) Patent No.: US 12,620,632 B2
(45) Date of Patent: May 5, 2026

(54) ULTRALIGHT, FIRE-EXTINGUISHING AND TEMPERATURE MODULATED CURRENT COLLECTOR DEVICES AND METHOD THEREFOR

(71) Applicant: The Board of Trustees of the Leland Stanford Junior University, Palo Alto, CA (US)

(72) Inventors: Yi Cui, Stanford, CA (US); Yusheng Ye, Stanford, CA (US); Lien-yang Chou, Stanford, CA (US); Hiang Kwee Lee, Stanford, CA (US); Yayuan Liu, Stanford, CA (US); Dingchang Lin, Stanford, CA (US); Wenxiao Huang, Stanford, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 651 days.

(21) Appl. No.: 17/919,172

(22) PCT Filed: Apr. 14, 2021

(86) PCT No.: PCT/US2021/027267
 § 371 (c)(1),
 (2) Date: Oct. 14, 2022

(87) PCT Pub. No.: WO2021/211701
 PCT Pub. Date: Oct. 21, 2021

(65) Prior Publication Data
 US 2023/0163368 A1      May 25, 2023

Related U.S. Application Data

(60) Provisional application No. 63/010,379, filed on Apr. 15, 2020.

(51) Int. Cl.
 *H01M 10/42* (2006.01)
 *H01M 4/131* (2010.01)
 (Continued)

(52) U.S. Cl.
 CPC ....... *H01M 10/4235* (2013.01); *H01M 4/131* (2013.01); *H01M 4/133* (2013.01); *H01M 4/661* (2013.01); *H01M 4/667* (2013.01)

(58) Field of Classification Search
 CPC .......................... H01M 4/667; H01M 10/4235
 See application file for complete search history.

(56) References Cited

U.S. PATENT DOCUMENTS

| 5,866,676 A | 2/1999 | Jensen | |
|---|---|---|---|
| 2005/0084760 A1* | 4/2005 | Hwang | ................. H01M 4/587 |
| | | | 429/231.95 |

(Continued)

FOREIGN PATENT DOCUMENTS

| CN | 106785126 A | 5/2017 |
|---|---|---|
| CN | 111048788 A | 4/2020 |

(Continued)

OTHER PUBLICATIONS

International Search Report and Written Opinion for PCT Application No. PCT/US2021/027267 dated Aug. 4, 2021.

(Continued)

*Primary Examiner* — Scott J. Chmielecki
(74) *Attorney, Agent, or Firm* — Foley & Larder LLP

(57) ABSTRACT

Example implementations include a current collector device with a first substantially planar metallic layer including a foil material, and a core layer including a polymer and phosphate fire retardant and disposed by a first planar surface thereof on a first planar surface of the first metallic layer. Example implementations also include a method of manufacturing a core layer for a current collector device, by combining (Continued)

benzene and oxy dianiline at a first ratio in a solvent to form a solution, adding dianhydride to the solution at a second ratio, adding triphenyl phosphate to the solution, polymerizing the solution by heating the solution to form a polymerized solution; and forming a polymer film from the polymerized solution. Example implementations also include a temperature modulating layer including a temperature modulating material and disposed by a first planar surface thereof on a second planar surface of the first core layer.

26 Claims, 9 Drawing Sheets

(51) Int. Cl.
  *H01M 4/133* (2010.01)
  *H01M 4/66* (2006.01)

(56) References Cited

U.S. PATENT DOCUMENTS

| | | | | |
|---|---|---|---|---|
| 2008/0026286 A1* | 1/2008 | Cui | H01M 50/184 | |
| | | | 429/185 | |
| 2012/0315537 A1* | 12/2012 | Ravdel | H01M 4/667 | |
| | | | 29/623.5 | |
| 2013/0011742 A1* | 1/2013 | Park | H01M 4/667 | |
| | | | 429/234 | |
| 2016/0126591 A1* | 5/2016 | Zhang | H01M 6/14 | |
| | | | 429/303 | |
| 2017/0155099 A1* | 6/2017 | Song | H01M 50/119 | |
| 2017/0155100 A1* | 6/2017 | Song | H01M 50/119 | |
| 2018/0212252 A1* | 7/2018 | Dillard | H01M 4/624 | |
| 2018/0254462 A1* | 9/2018 | Kwon | H01M 4/667 | |
| 2019/0267634 A1* | 8/2019 | Amatucci | H01M 4/667 | |
| 2019/0326593 A1* | 10/2019 | Ozkan | H01M 4/625 | |
| 2020/0377690 A1* | 12/2020 | Ootsuki | H01M 50/105 | |
| 2021/0057747 A1* | 2/2021 | Sonobe | H01M 4/621 | |
| 2021/0313587 A1* | 10/2021 | Kwon | H01G 11/22 | |
| 2023/0163368 A1* | 5/2023 | Cui | H01M 4/131 | |
| | | | 429/126 | |

FOREIGN PATENT DOCUMENTS

| | | |
|---|---|---|
| KR | 100614340 B1 | 8/2011 |
| KR | 1020110138862 A | 12/2011 |
| WO | WO-2004/059781 A2 | 7/2004 |

OTHER PUBLICATIONS

Ye, Y. et al., "Ultralight and fire-extinguishing current collectors for high-energy and high-safety lithiumion batteries", Nature energy, 2020.10, vol. 5, pp. 786-793.

* cited by examiner

600

Combine Benzene and Oxydianiline (ODA) in Solvent     510

Add Dianhydride to Solution     520

Add Triphenyl Phosphate (TPP) to Solution     530

Polymerize Solution by Heating     540

Form Polymer Sheet from Polymerized Solution     560

700

800

ULTRALIGHT, FIRE-EXTINGUISHING AND TEMPERATURE MODULATED CURRENT COLLECTOR DEVICES AND METHOD THEREFOR

CROSS-REFERENCE TO RELATED PATENT APPLICATIONS

This application is a National Stage Entry under 35 U.S.C. § 371 of International Application No. PCT/US2021/027267, filed Apr. 14, 2021, which claims priority to U.S. Provisional Patent Application Ser. No. 63/010,379, entitled "ULTRALIGHT, FIRE-EXTINGUISHING AND TEMPERATURE MODULATED CURRENT COLLECTOR FOR HIGHER-ENERGY AND SAFER LITHIUM ION BATTERIES," filed Apr. 15, 2020, the contents of all such applications being hereby incorporated by reference in its entirety and for all purposes as if completely and fully set forth herein.

STATEMENT OF GOVERNMENT SPONSORED RESEARCH

This invention was made with Government support under contract DE-AC02-76SF00515 awarded by the Department of Energy. The Government has certain rights in the invention.

TECHNICAL FIELD

The present implementations relate generally to battery devices, and more particularly to ultralight, fire-extinguishing and temperature modulated current collector devices.

BACKGROUND

Lithium-ion battery (LIB) technology is or could be valuable to modern human civilization, including portable electronics, electric vehicles, and grid energy storage. The rapid development of smart devices increases the need for LIB with higher energy capacity and safety characteristics. However, conventional systems are hindered by, variously, poor mechanical behavior, a need for additional electrolytes, high cost, poor scalability, and chemical instability. Thus, in conventional systems, battery energy remains limited due to a lack of lightweight and robust current collector devices.

SUMMARY

Example implementations include a current collector device with a first substantially planar metallic layer including a foil material, and a core layer including a polymer and phosphate fire retardant and disposed by a first planar surface thereof on a first planar surface of the first metallic layer.

Example implementations also include a device with a first electrode layer including an electrode material and disposed on a second planar surface of the first metallic layer opposite to the first planar surface of the first metallic layer.

Example implementations also include a device with a second substantially planar metallic layer including the foil material and disposed by a planar surface thereof on a second planar surface of the core layer opposite to the first planar surface of the core layer.

Example implementations also include a device with a second electrode layer including the electrode material and disposed on a second planar surface of the second metallic layer opposite to the first planar surface of the second metallic layer.

Example implementations also include a device where the first metallic layer has a thickness of 500 nm.

Example implementations also include a device where the second metallic layer has a thickness of 500 nm.

Example implementations also include a device where a weight percentage of triphenyl phosphate to polyimide and triphenyl phosphate is between 0 and 50 percent.

Example implementations also include a device where the weight percentage of triphenyl phosphate to polyimide and triphenyl phosphate is 10 percent.

Example implementations also include a device where the weight percentage of triphenyl phosphate to polyimide and triphenyl phosphate is 25 percent.

Example implementations also include a device where the weight percentage of triphenyl phosphate to polyimide and triphenyl phosphate is 40 percent.

Example implementations also include a device where a thickness of the current collector device is between 5 and 28 μm.

Example implementations also include a device where the thickness of the current collector device is 5 μm.

Example implementations also include a device where the thickness of the current collector device is 9 μm.

Example implementations also include a device where the thickness of the current collector device is 18 μm.

Example implementations also include a device where the thickness of the current collector device is 28 μm.

Example implementations also include a device where the foil material comprises copper.

Example implementations also include a device where the electrode material comprises graphite.

Example implementations also include a device where the foil material comprises aluminum.

Example implementations also include a device where the electrode material comprises lithium cobalt oxide.

Example implementations also include a device with a temperature modulating layer including a temperature modulating material and disposed by a first planar surface thereof on a second planar surface of the first core layer.

Example implementations also include a device with a second core layer including polyimide and triphenyl phosphate, where the temperature modulating layer is disposed by a second planar surface thereof on a first planar surface of the second core layer.

Example implementations also include a device where the temperature modulating material comprises nickel.

Example implementations also include a method of manufacturing a core layer for a current collector device, by combining benzene and oxydianiline at a first ratio in a solvent to form a solution, adding dianhydride to the solution at a second ratio, adding triphenyl phosphate to the solution, polymerizing the solution by heating the solution to form a polymerized solution; and forming a polymer film from the polymerized solution.

Example implementations also include a method including degassing the polymerized solution.

Example implementations also include a method where the first ratio comprises a molar ratio of 1:1 of benzene to oxydianiline.

Example implementations also include a method where the solvent comprises dimethylacetamide.

Example implementations also include a method where the dianhydride comprises pyromellitic dianhydride.

Example implementations also include a method where the second ratio comprises a molar ratio of 1.02:1 of dianhydride to the solution.

Example implementations also include a method where the forming the polymer film from the polymerized solution includes depositing the polymerized solution on a substrate.

Example implementations also include a method where the forming the polymer film from the polymerized solution includes solidifying the polymerized solution by heating.

Example implementations also include a method of manufacturing a current collector device, by applying a plasma treatment to a polymer film, and depositing conductive material on the treated polymer film.

Example implementations also include a method including depositing electrode material on the conductive material.

Example implementations also include a method where the conductive material comprises copper.

Example implementations also include a method where the electrode material comprises graphite.

Example implementations also include a method where the conductive material comprises aluminum.

Example implementations also include a method where the electrode material comprises lithium cobalt oxide.

Example implementations also include a method where the depositing the conductive material comprises depositing the conductive material at a thickness of 500 nm.

Example implementations also include a method where the depositing the conductive material comprises depositing the conductive material by a pulsed direct current magnetron.

Example implementations also include a method where the plasma treatment comprises a molecular oxygen (O2) plasma treatment.

Example implementations also include a method where the polymer film comprises polyimide and triphenyl phosphate.

Example implementations also include a method including combining benzene and oxydianiline at a first ratio in a solvent to form a solution, adding dianhydride to the solution at a second ratio, adding triphenyl phosphate to the solution, polymerizing the solution by heating the solution to form a polymerized solution, and forming the polymer film from the polymerized solution.

BRIEF DESCRIPTION OF THE DRAWINGS

These and other aspects and features of the present implementations will become apparent to those ordinarily skilled in the art upon review of the following description of specific implementations in conjunction with the accompanying figures, wherein.

DETAILED DESCRIPTION

Figure 1:
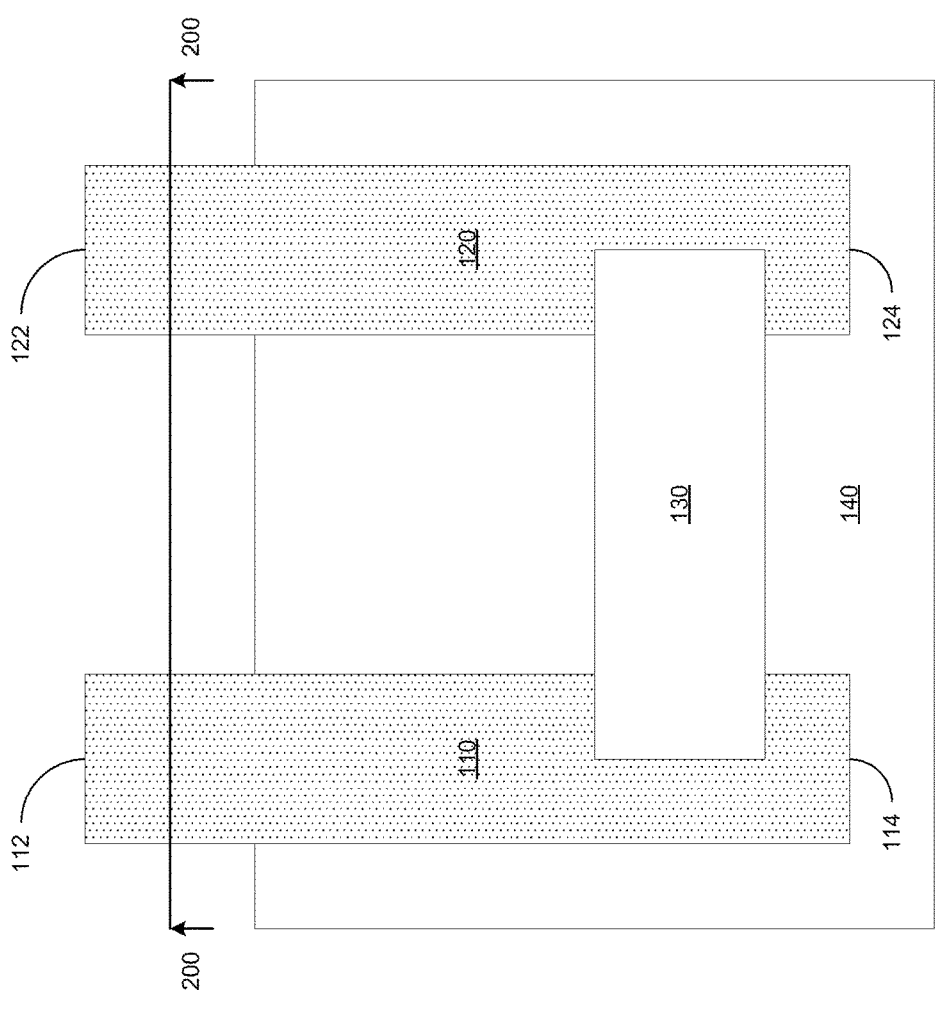
FIG. 1 illustrates an example plan view of an example battery device including an example current collector cathode and an example current collector anode, in accordance with present implementations.

The present implementations will now be described in detail with reference to the drawings, which are provided as illustrative examples of the implementations so as to enable those skilled in the art to practice the implementations and alternatives apparent to those skilled in the art. Notably, the figures and examples below are not meant to limit the scope of the present implementations to a single implementation, but other implementations are possible by way of interchange of some or all of the described or illustrated elements. Moreover, where certain elements of the present implementations can be partially or fully implemented using known components, only those portions of such known components that are necessary for an understanding of the present implementations will be described, and detailed descriptions of other portions of such known components will be omitted so as not to obscure the present implementations. Implementations described as being implemented in software should not be limited thereto, but can include implementations implemented in hardware, or combinations of software and hardware, and vice-versa, as will be apparent to those skilled in the art, unless otherwise specified herein. In the present specification, an implementation showing a singular component should not be considered limiting; rather, the present disclosure is intended to encompass other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present implementations encompass present and future known equivalents to the known components referred to herein by way of illustration.

It is to be understood that high-energy LIB devices and systems can entail serious safety concerns due to various flammable components therein or associated therewith. As one example, flammable components can be highly flammable organic electrolytes and polyolefin separators. In some implementations, during shorting, overcharging, exposure to high temperature, or other thermal abuse conditions, exothermic reactions readily occur. As one example, high temperature can be a temperature exceeding 150° C. This release of energy can cause separator shrinkage and decomposition of a solid electrolyte interface film/electrolyte, and can further cause a chain of additional exothermic reactions leading to thermal runaway, fires and explosions. In addition, the breakdown of electrodes, and metal oxide material generally, can exacerbate battery fires by providing an additional oxygen source for combustion. Thus, it is advantageous for high-energy LIB to exhibit safe battery operation including a reduced combustion risk, increased fire extinguishing characteristics, or any combination thereof. Thus, a technological solution for ultralight and self-extinguishing current collector devices is desired.

It is to be understood that cell flame-retardants or additives can improve safety to a certain extent, but can also reduce electron/ion transport and add extra weight. In some implementations, replacing an electrolyte solvent with non-flammable molecules, increasing the concentration of lithium salts, and adopting solid-state electrolytes can also help to formulate safe batteries. However, these strategies can severely compromise battery performance by increasing electrolyte viscosity, decreasing lithium-ion conductivity, altering the operating voltage, or degrading the mechanical integrity of the separator. In some implementations, current collector with positive temperature coefficients could also help to improve batteries safety. It is to be further understood that high leakage current, reduced electrical conductivity, and increased charge collector weight can also reduce battery performance.

In some implementations, a composite of polyimide (PI), triphenyl phosphate (TPP) and copper (Cu) (PI-TPP-Cu) provides a decrease in material density while maintaining comparable mechanical properties to Cu foil. In some implementations, the decrease in material density is approximately fourfold over conventional systems. In some implementations, a specific energy of LIB assembled using charge collector devices in accordance with present implementations increases by approximately 16-26% over conventional systems. In some implementations, flame retardant encapsulated in a charge collector device reduces, mitigates, eliminates, or the like, potential negative impacts on the electron/ion pathway and side reactions.

FIG. 1 illustrates an example plan view of an example battery device including an example current collector cathode and an example current collector anode, in accordance with present implementations. As illustrated by way of example in FIG. 1, an example battery device 100 includes a current collector cathode 110, a current collector anode 120, a conduction portion 130, and a pouch 140.

In some implementations, an ultralight charge collector device includes PI with fire-extinguishing properties that both minimizes dead weight and increase fire-safety of an LIB. In some implementations, the charge collector device is fabricated by embedding TPP flame-retardant into lightweight PI films, followed by coating two ultrathin external metal layers on both sides of the PI film to impart high electrical conductivity. As one example, charge collector device can possess a mass loading of ~1.54 mg cm-2. As another example, this mass loading can be seven times lighter than conventional systems. In some implementations, a charge collector device in accordance with present implementations advantageously isolates flame retardant from the LIB electron/ion pathway and chemical reactions, advantageously maintains stability of normal cell operation, and advantageously allows fast and efficient self-extinguishing of battery fires in the event of thermal runaway. It is to be understood that an ultralight and flame-retardant-embedded charge collector device therefore advantageously improves both specific energy and critical safety of LIBs, as opposed to an improvement in either specific energy or fire safety alone at the expense of the other.

The current collector cathode 110 includes a cathode terminal portion 112 operatively couplable to an external electrical source, and a battery portion 114 operatively coupled or couplable to the conduction portion 130. In some implementations, the cathode terminal portion 112 at least partially protrudes from the pouch 140 of the battery device 100. In some implementations, incorporating TPP flame-retardant into PI and coating Cu on the surfaces to form PI-TPP-Cu results in an ultralight specific mass of PI-TPP-Cu for the current collector cathode 110 of a charge collector device. As one example, an ultralight specific mass can be 1.54 mg cm$^{-2}$. In some implementations, this specific mass is a result of TPP having a lower density than PI. As one example, a density of TPP can be 1.18 g cm$^{-3}$ and a density of PI can be 1.42 g cm$^{-3}$. In some implementations, this specific mass is significantly less than the specific mass of conventional systems, at, for example, 5.38 mg cm$^{-2}$. Thus, in some implementations, the current collector cathode 110 including PI-TPP-Cu achieves a notable increase in specific energy, and thus further achieves a specific energy equal to or greater than 400 Wh kg$^{-1}$.

The current collector anode 120 includes an anode terminal portion 122 operatively couplable to an external electrical source, and a battery portion 124 operatively coupled or couplable to the conduction portion 130. In some implementations, the anode terminal portion 122 at least partially protrudes from the pouch 140 of the battery device 100. In some implementations, the current collector anode 120 corresponds in structure characteristics to the current collector cathode, with the exception that the current collector anode 120 includes aluminum (Al) instead of copper. Thus, in some implementations, the current collector anode is a PI-TPP-Al current collector device. In some implementations, the current collector anode 120 corresponds in electrical characteristics to the current collector cathode.

The conduction portion 130 operatively couples the current collector cathode 110 to the current collector anode 120. In some implementations, the conduction portion is or includes a metallic connector. As one example, the metallic connector can be or include nickel (Ni). In some implementations, the conduction portion 130 includes, is operatively coupled to, is operatively couplable to, or the like, a battery. As one example, the battery can be or include at least one LIB cell, stack, or the like. In some implementations, deposited cathode and anode layers of the current collector cathode 110 and the current collector anode 120 are respectively bridged with a Cu foil or an Al foil. Thus, in some implementations, both the current collector cathode 110 and the current collector anode 120 are welded, or the like, to the conduction portion by the Cu foil or the Al foil.

The battery pouch 140 at least partially houses one or more of the current collector cathode 110, the current collector anode 120, and the conduction portion 130. In some implementations, the battery pouch includes one or more pouch cells assembled in a jelly roll configuration separator. As one example, separators can include polypropylene (PP) and polyethylene (PE) in a PP-PE-PP configuration. As another example, the separators can have a thickness of 25 μm. In some implementations, the battery pouch includes enclosed therein an electrolyte in liquid form. As one example, the battery pouch 140 can include 600 μL of electrolyte. It is to be understood that TPP in the pouch cell can impart a flame-retardant property by rapidly releasing phosphate-based free radicals in response to a fire, to suppress the fire of a burning battery.

Figure 2A:
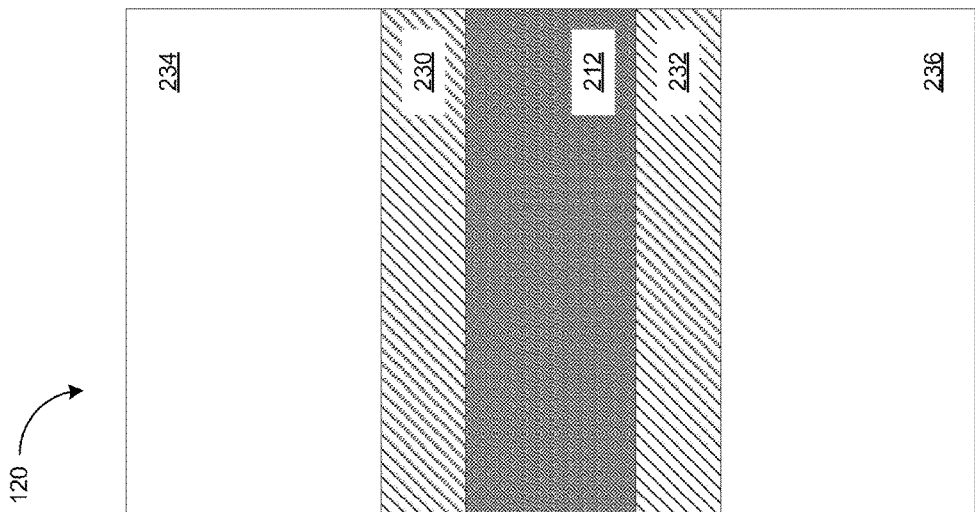
FIG. 2A illustrates an example cross-sectional view of an example current collector cathode and an example current collector anode further to the example device of FIG. 1.
Figure 2A:
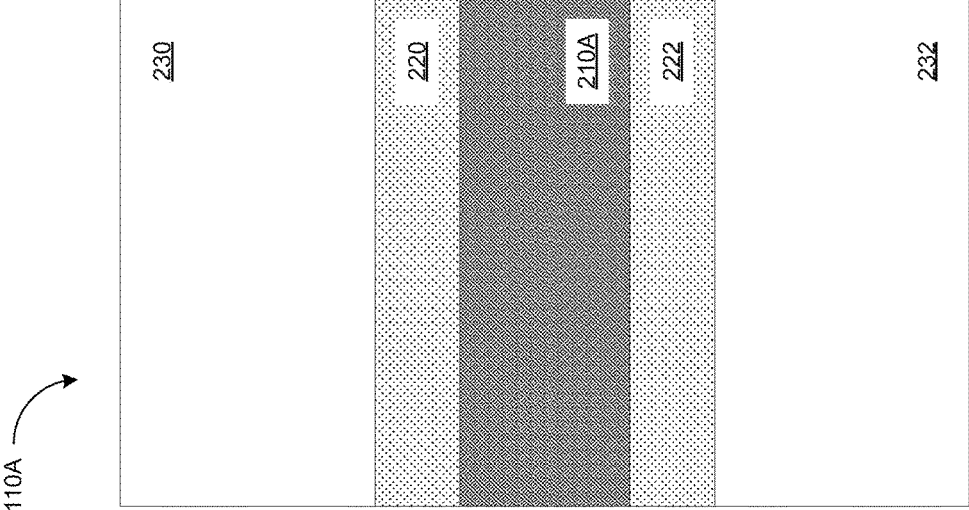

FIG. 2A illustrates an example cross-sectional view of an example current collector cathode and an example current collector anode further to the example device of FIG. 1. As illustrated by way of example in FIG. 2A, an example cross-sectional view 200A includes the current collector cathode 110A corresponding to the current collector cathode 110, and the current collector anode 120. The example current collector cathode 110A includes a first core layer 210A, a first metallic cathode layer 220, a second metallic cathode layer 222, a first cathode electrode layer 230, and a second cathode electrode layer 232. The example current collector anode 120 includes a second core layer 212, a first metallic anode layer 230, a second metallic anode layer 232, a first anode electrode layer 234, and a second anode electrode layer 236.

The first core layer 210A is a planar structure and includes one or more fire-extinguishing materials disposed therein. It is to be understood that PI is advantageous for inclusion into the first core layer 210A due at least to its low density, mechanical properties, resistance to solvents, thermal stability, and flame resistance. As one example, PI can exhibit thermal stability above 400° C. It is to be further understood that the first core layer 210A can be or include at least one of many different PIs, or the like. In some implementations, the first core layer 210A is or includes a non-porous PI, to maximize the mechanical performance. As one example, mechanical performance can include one or more of deformability, elasticity, hardness, porosity, and the like. It is to be understood that the second core layer 212 can have a structure corresponding to the structure of the first core layer 210.

The first metallic cathode layer 220 is a planar structure disposed at a first planar surface thereof in contact with a first planar surface of the first core layer 210. In some implementations, the first metallic cathode layer 220 is affixed to, bonded with, or the like, the first core layer 210 at the first planar surface of the first core layer 210. In some implementations, the first metallic cathode layer 220 is or includes a metal. As one example, the metal can be Cu or the like.

The second metallic cathode layer 222 is a planar structure disposed at a first planar surface thereof in contact with a second planar surface of the first core layer 210. In some implementations, the first metallic cathode layer 220 is affixed to, bonded with, or the like, the first core layer 210 at the second planar surface of the first core layer 210. In some implementations, the second planar surface of the first core layer 210 is opposite to the first planar surface of the first core layer 210. In some implementations, the second metallic cathode layer 220 is or includes a metal corresponding to the metal of the first metallic cathode layer 220.

The first cathode electrode layer 230 is a planar structure disposed at a first planar surface thereof in contact with a second planar surface of the first metallic cathode layer 220. In some implementations, the first cathode electrode layer 230 is affixed to, bonded with, or the like, the first metallic cathode layer 220 at the second planar surface of the first metallic cathode layer 220. In some implementations, the second planar surface of the first metallic cathode layer 220 is opposite to the first planar surface of the first metallic cathode layer 220. In some implementations, the first metallic cathode layer 220 is or includes a cathode electrode material. As one example, the cathode electrode material can be graphite (Gr) or the like.

The second cathode electrode layer 232 is a planar structure disposed at a first planar surface thereof in contact with a second planar surface of the second metallic cathode layer 222. In some implementations, the second cathode electrode layer 232 is affixed to, bonded with, or the like, the second metallic cathode layer 222 at the second planar surface of the second metallic cathode layer 222. In some implementations, the second planar surface of the second metallic cathode layer 222 is opposite to the first planar surface of the second metallic cathode layer 222. In some implementations, the second metallic cathode layer 220 is or includes a cathode electrode material corresponding to the cathode electrode material of the first metallic cathode layer 220.

In some implementations, discharge capacities of the current collector cathode 110 are higher than those of Cu/Gr structures from 0.1 C to 1 C. In some implementations, at a rate of 0.5 C, a capacity of the current collector cathode 110 retains at 226.0 mAh g$^{-1}$ and is higher than that of Cu/Gr electrode. As one example, the capacity of a Cu/Gr electrode can be 146.8 mAh g$^{-1}$ and the current collector cathode 110 can advantageously demonstrate a 54.0% capacity increase over at least the Cu/Gr electrode structure. It is to be understood that this Coulombic efficiency demonstrates that TPP does not impede battery normal operation. As one example, after 200 charge-discharge cycles, capacity retentions of full cells in accordance with present implementations can be maintained at levels over 80% as compared to capacity before the 200 charge-discharge cycles. Thus, in some implementations, current collector devices in accordance with present implementations increase specific energy of LIBs. As one example, specific energy can be approximately 296 Wh kg$^{-1}$ at an initial cycle, and to approximately 261 Wh kg$^{-1}$ after 200 charge-discharge cycles.

Figure 2B:
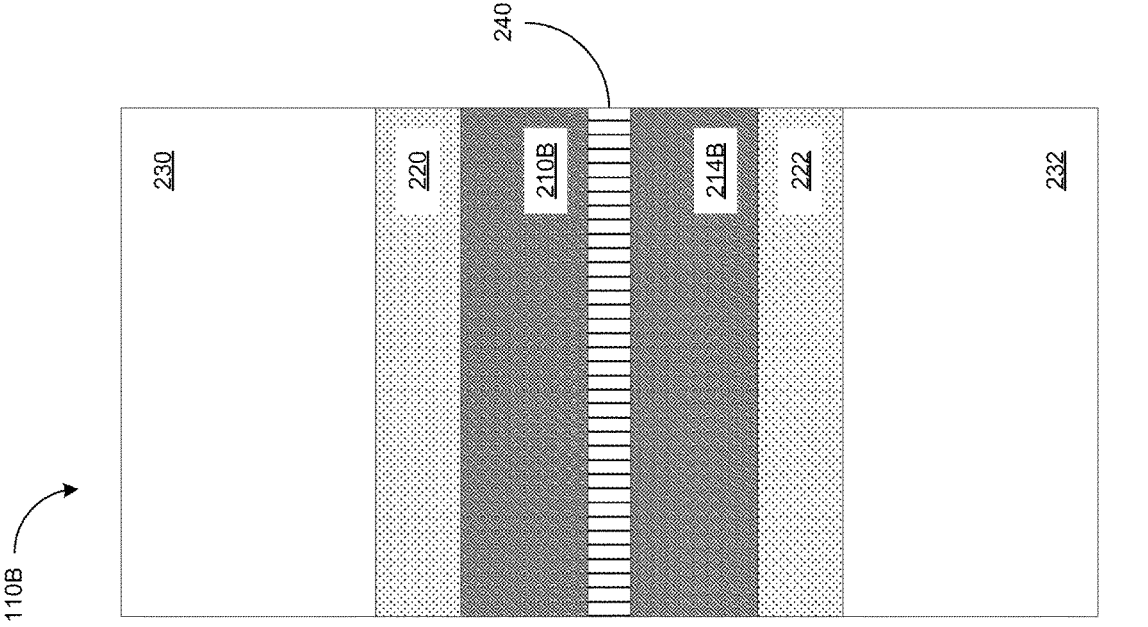
FIG. 2B illustrates an example cross-sectional view of an example temperature modulated current collector cathode further to the example device of FIG. 1.

FIG. 2B illustrates an example cross-sectional view of an example temperature modulated current collector cathode further to the example device of FIG. 1. As illustrated by way of example in FIG. 2B, an example cross-sectional view 200B includes a temperature modulated current collector cathode 110B. The example current collector cathode 110B includes a first core layer 210B a second core layer 214B, the first metallic cathode layer 220, the second metallic cathode layer 222, the first cathode electrode layer 230, the second cathode electrode layer 232, and a temperature modulating layer 240. It is to be understood that a device in accordance with present implementations can include the temperature modulated current collector cathode 110B and the current collector anode 120.

The first core layer 210B and the second core layer 214B are each planar structures and each can include one or more fire-extinguishing materials disposed therein. It is to be understood that the first core layer 210B and the second core layer 214B can correspond in structure to the first core layer 210A. In some implementations, the first core layer 210B is disposed at a first planar surface thereof in contact with the planar surface of the first metallic cathode layer 220, and is disposed at a second planar surface thereof opposite to the first planar surface thereof in contact with a first planar surface of the temperature modulating layer 240. In some implementations, the second core layer 214B is disposed at a first planar surface thereof in contact with the planar surface of the second metallic cathode layer 222, and is disposed at a second planar surface thereof opposite to the first planar surface thereof in contact with a second planar surface of the temperature modulating layer 240. It is to be understood that the core layer can be a polymer optionally including one or more fire-extinguishing materials disposed therein. In some implementations, a polymer includes at least one of polyimide, polyethylene terephthalate, polytetrafluoroethylene, poly(vinylidene fluoride-co-hexafluoropropylene), polyethylene, polypropylene, and polyetheretherketone. In some implementations, a fire retardant includes at least one of phosphorus, a halogen, silicone, nitrogen, and metal. As one example, a phosphorus-containing flame retardant can include triphenyl phosphate, triethyl phosphate tricresylphosphate, tris(1,3-dichloro-2-propyl) phosphate, tris(2-chloroethyl)phosphate, tris(chloropropyl)

phosphate, tris-2,2,2-trifluoroethyl phosphate, cyclo-phosphazene, and ammonium polyphosphate. As another example, a halogen-containing flame retardant can include decabromodiphenyl ethane.

The temperature modulating layer 240 includes at least one temperature modulating material and is disposed between the first core layer 210B and the second core layer 214B. As one example, the temperature modulating material can be or include nickel (Ni). As another example, the temperature modulating layer 240 can have a thickness of 200 nm.

It is to be understood that low temperature, high rate, and large polarization can trigger lithium plating in preference to lithium intercalation. Such lithium plating can drastically cause capacity fade and safety concerns. It is to be further understood that plated lithium with mossy structure and extensive dendrite formation can cause a short-circuit, resulting rapid heat generation and even cause fire or explosion.

The mechanism of lithium plating is thus critical to address the challenges. Basically, lithium plating is triggered by ion transportation in the electrolyte, intercalation reaction at graphite/electrolyte interface and the lithium diffusion in graphite bulk. In some implementations, as temperature increases from 20° C. to 60° C., the electrolyte conductivity, graphite intercalation kinetic and graphite bulk lithium diffusion can be increased by 1.9 times, 13 times and 5.6 times, respectively. Thus, elevating temperature of the batteries can mitigate or eliminate lithium deposition on graphite anode. In some implementations, coating different anode materials on the polymer film results in different anodic electrodes. As one example, the anode materials can correspond to anode materials included in the current collector anode 120.

Similar to the full cells fabricated based on the current collector cathode 110A, a full cell including lithium cobalt oxide and graphite can be assembled based on such ultralight and temperature current collector. By this way, the temperature of the full cell can be advantageously increased uniformly throughout the whole battery. Thus, in some implementations, minor temperature gradient will occur in the batteries, preventing localized heat generation and localized lithium plating in the batteries. Batteries can be charged at elevated temperature at extremely high current rate and then discharged at room temperature. The flame retardant of the polymer film can be trapped within polyimide and beneath Cu layers. It is to be understood that an ultralight, temperature modulated, and fire-retardant-embedded current collector can advantageously address critical battery safety concerns, improve specific energy of LIBs, and can concurrently achieve extreme fast charging for batteries.

Figure 3:
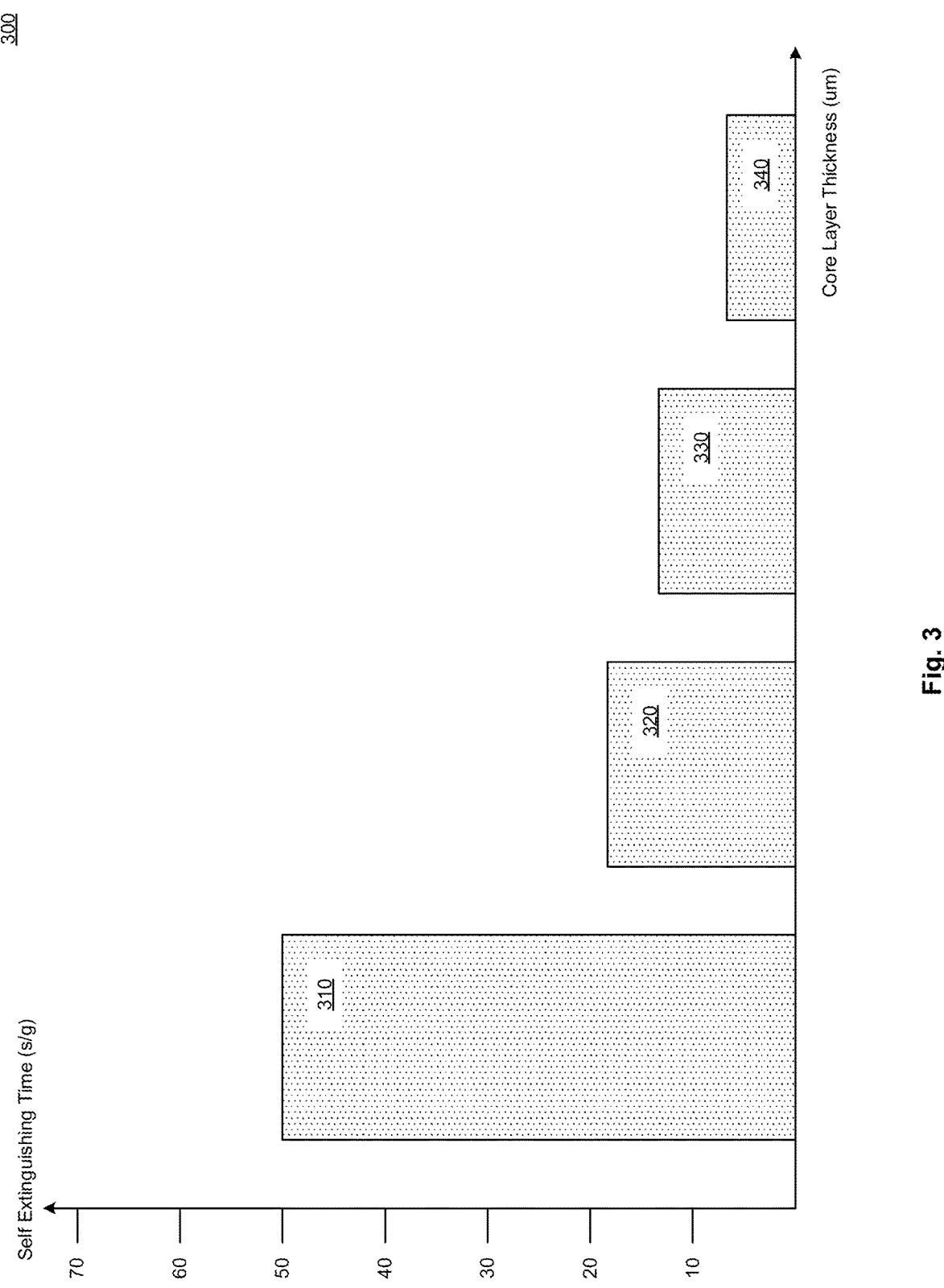
FIG. 3 illustrates an example diagram of self-extinguishing time performance with respect to core layer thickness of a current collector device, in accordance with present implementations.

FIG. 3 illustrates an example diagram of self-extinguishing time performance with respect to core layer thickness of a current collector device, in accordance with present implementations. As illustrated by way of example in FIG. 3, an example diagram of self-extinguishing time performance 300 includes a first self-extinguishing time performance 310, a second self-extinguishing time performance 320, a third self-extinguishing time performance 330, and a fourth self-extinguishing time performance 340.

In some implementations, thickness of the first and second metallic cathode layers 220 and 222 is variable to achieve particular electrical conductivity of a corresponding charge collector device. In some implementations, as thickness of a metallic cathode layer increases, the resistivity of the charge collector on the corresponding side of the core layer, with the metallic cathode layer of increasing thickness, decreases due to more effective connections on the Cu conductive layer. In some implementations, a metallic cathode layer can have a thickness of 500 nm, with a particular electrical conductivity. As one example, a particular electrical conductivity can be $5.71 \times 10^7$ S m$^{-1}$. It is to be understood that the thickness PI or PI-TPP core layers 210 and 212 can be varied without varying electrical conductivity of the charge collector device, because the electrical conductivity is dependent on thickness of a metallic cathode layer or metallic anode layer, and independent of the thickness of the core layer. It is to be understood that a dense copper coating layer can prevent TPP from dissolving into electrolyte of the battery pouch 140 or the like. As one example, a PI-TPP-Cu based graphite electrode exhibits advantageous fire retardant properties where a flame can completely self-extinguish within 1.0 s.

The first self-extinguishing time performance 310 corresponds to a combined metallic layer and core layer thickness of 5 μm and a self-extinguishing time of approximately 50 s g$^{-1}$. The second self-extinguishing time performance 320, corresponds to a combined metallic layer and core layer thickness of 9 μm and a self-extinguishing time of approximately 15 s g$^{-1}$. In some implementations, self-extinguishing time substantially decreases when the thickness of PI-TPP-Cu increases from 5 μm to 9 μm. As one example, the 9.0 μm thick charge collector device can possess mechanical behavior having a Young's modulus of 2.01 GPa. The third self-extinguishing time performance 330 corresponds to a combined metallic layer and core layer thickness of 18 μm and a self-extinguishing time of approximately 12 s g$^{-1}$. The fourth self-extinguishing time performance 340 corresponds to a combined metallic layer and core layer thickness of 28 μm and a self-extinguishing time of approximately 10 s g$^{-1}$. In some implementations, even when the thickness is increased to 28 μm, the average specific mass of the charge collector device is advantageously low at 3.39 mg cm$^{-2}$. This high-side mass is still much lighter than conventional systems incorporated into LIB.

In some implementations, self-extinguishing includes a suppression reaction at a particular temperature threshold. As one example, a temperature threshold can be a temperature above 244° C., corresponding to the boiling point of TPP. In some implementations, at this temperature, the fire retardant will be gasified and quickly released. The TPP can thus decompose and generate phosphorus-containing free radicals including PO• and PO$_2$•, which then neutralize the highly active H• and HO• radicals released by the burning electrolyte or other flammable components.

Figure 4:
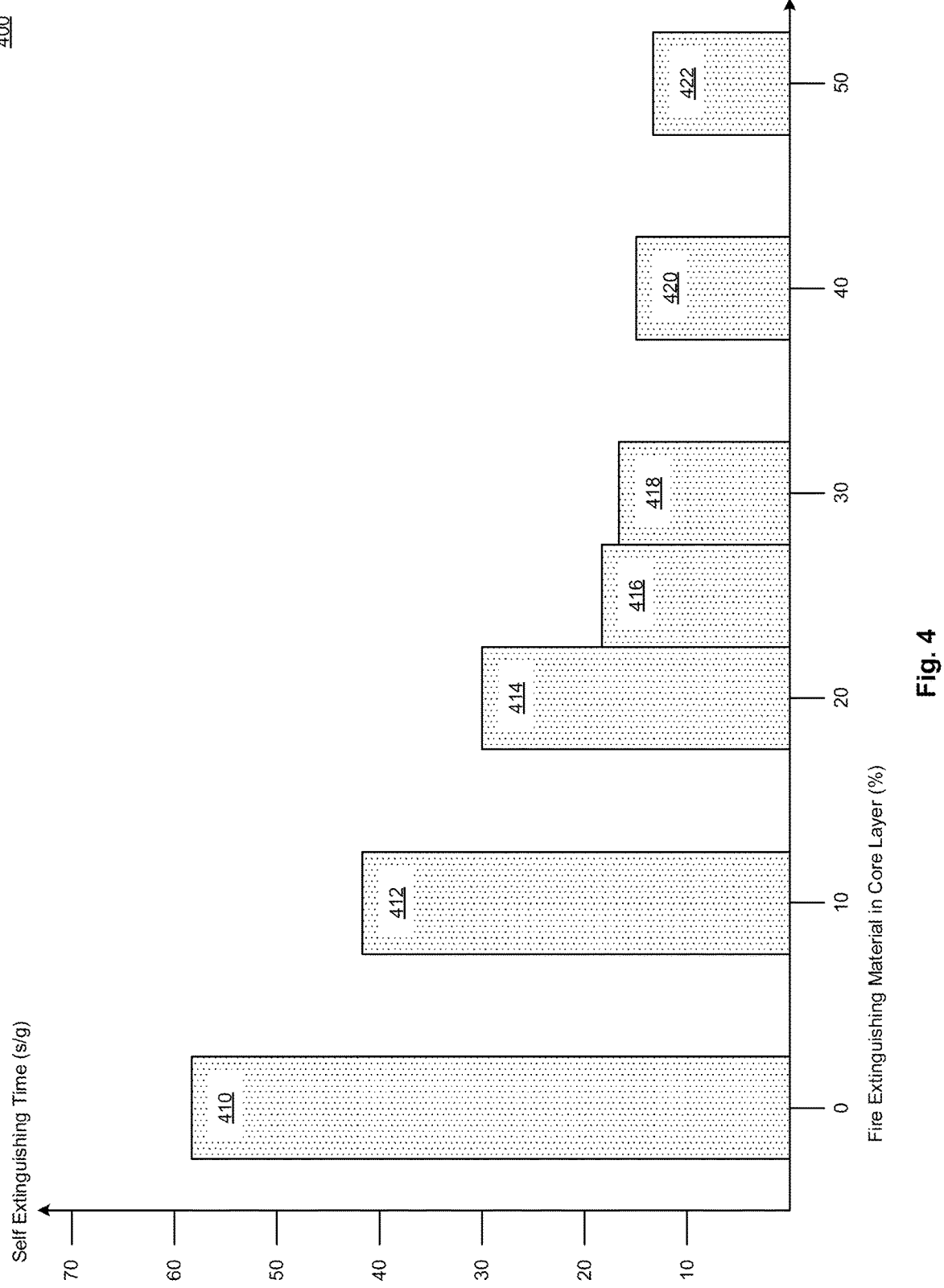
FIG. 4 illustrates an example diagram of self-extinguishing time performance with respect to a percentage of fire extinguishing material present in a core layer of a current collector device, in accordance with present implementations.

FIG. 4 illustrates an example diagram of self-extinguishing time performance with respect to a percentage of fire extinguishing material present in a core layer of a current collector device, in accordance with present implementations. As illustrated by way of example in FIG. 4, an example diagram of self-extinguishing time performance 400 includes a first self-extinguishing time performance 410, a second self-extinguishing time performance 412, a third self-extinguishing time performance 414, a fourth self-extinguishing time performance 416, a fifth self-extinguishing time performance 418, a sixth self-extinguishing time performance 420, and a seventh self-extinguishing time performance 422.

It is to be understood that as TPP content increases self-extinguishing time decreases substantially linearly and achieves a small self-extinguishing time value. Self-extinguishing time performances can thus vary by percentage of fire extinguishing material present in a core layer of a current collector device. The first self-extinguishing time performance 410 corresponds to a percentage of fire extinguishing material present at approximately 0% and a self-extinguishing time of approximately 55 s g$^{-1}$. The second self-extinguishing time performance 412 corresponds to a percentage of fire extinguishing material present at approximately 10% and a self-extinguishing time of approximately 40 s g$^{-1}$. The third self-extinguishing time performance 414 corresponds to a percentage of fire extinguishing material present at approximately 20% and a self-extinguishing time of approximately 30 s g$^{-1}$. The fourth self-extinguishing time performance 416 corresponds to a percentage of fire extinguishing material present at approximately 25% and a self-extinguishing time of approximately 20 s g$^{-1}$. The fifth self-extinguishing time performance 418 corresponds to a percentage of fire extinguishing material present at approximately 30% and a self-extinguishing time of approximately 18 s g$^{-1}$. The sixth self-extinguishing time performance 420 corresponds to a percentage of fire extinguishing material present at approximately 40% and a self-extinguishing time of approximately 15 s g$^{-1}$. The seventh self-extinguishing time performance 422 corresponds to a percentage of fire extinguishing material present at approximately 50% and a self-extinguishing time of approximately 125 s g$^{-1}$.

Figure 5:
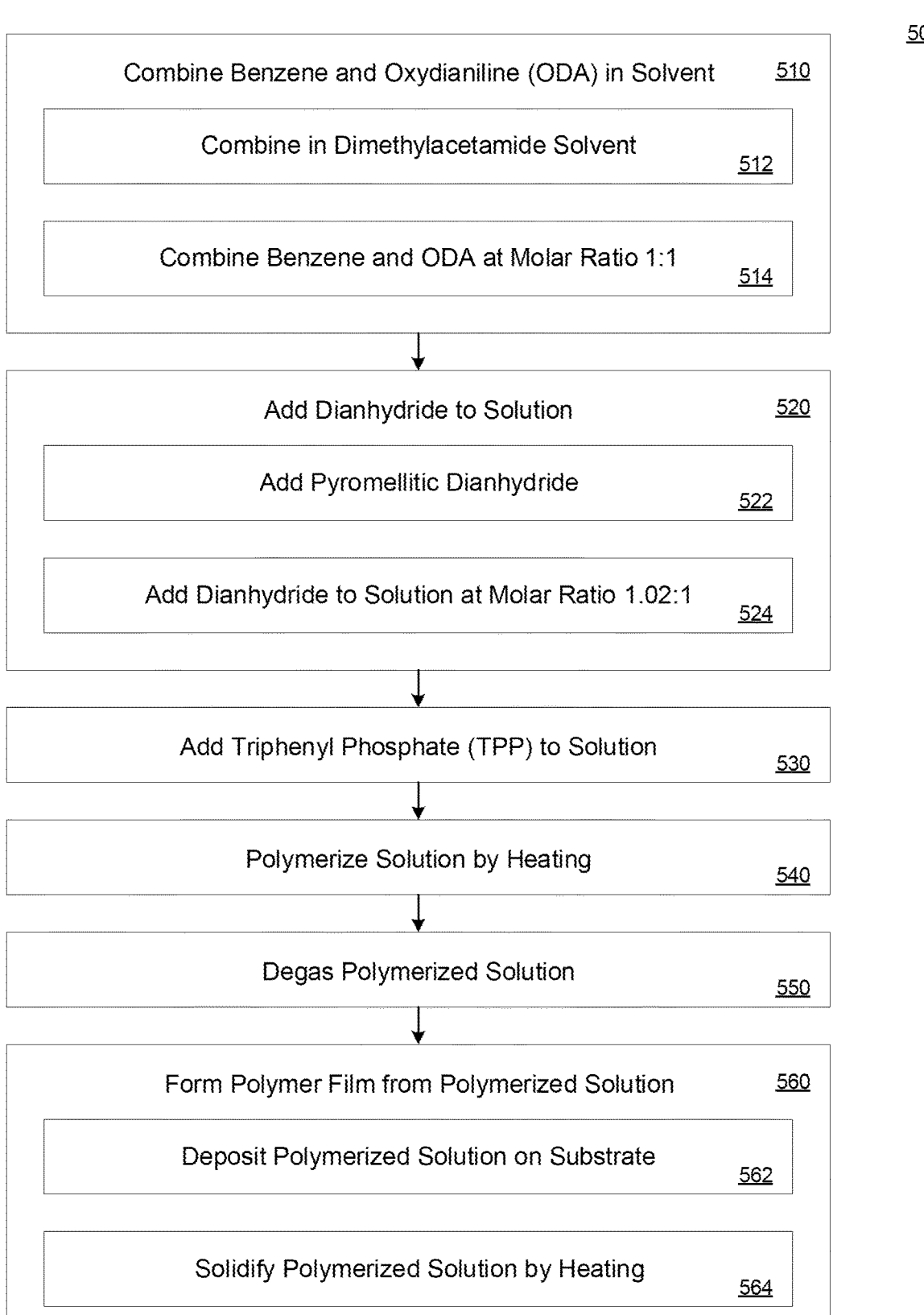
FIG. 5 illustrates a first example method of manufacturing a core layer of a current collector device, in accordance with present implementations.

FIG. 5 illustrates a first example method of manufacturing a core layer of a current collector device, in accordance with present implementations. In some implementations, at least a portion of the example device 100 is manufactured according to method 500 according to present implementations. It is to be understood that method 500 can result in high thermal stability as compared to conventionally manufactured PI. As one example, high thermal stability can be thermal stability at temperatures greater than 550° C. In some implementations, the method 500 begins at step 510.

At step 510, the example system combines benzene and oxydianiline in a solvent to form a solution. In some implementations, the example system combines 1,4-bis(4-amino-2-trifluoromethylphenoxy) benzene (6FAPB) and 4,4'-oxydianiline (4,4'-ODA) to dimethylacetamide. As one example, an amount of benzene can be 1.606 g, 3.75 mmol, an amount of oxydianiline can be 0.751 g, 3.75 mmol and an amount of dimethylacetamide can be 28 mL. In some implementations, step 510 includes at least one of steps 512 and 514. At step 512, the example system combines benzene and oxydianiline in dimethylacetamide solvent. As one example, N,N-Dimethylacetamide (DMAC) can be used as solvent for the condensation polymerization of polyamic acid (PAA). At step 514, the example system combines benzene and oxydianiline at a 1:1 molar ratio of benzene to oxydianiline. The method 500 then continues to step 520.

It is to be understood that any of pyromellitic dianhydride (PMDA), 4,4'-oxydianiline (ODA), 3, 3', 4, 4'-oxydiphthalic dianhydride (ODPA), 3,3', 4,4'-benzophenone tetracarboxylic dianhydride (BTDA), 4,4'-hexatluoroisopropylidene dianhydride (6FDA), benzidine (BZD), 3,3,4, 4-Diphenylsulfonetetracarboxylic dianhydride (DSDA), and 1,4-bis(4-amino-2-trifluoromethylphenoxy) benzene (6FAPB), and the like can be used in various combinations for a charge collector in accordance with present implementations. In some implementations, combinations include at least one of PMDA-ODA, ODPA-ODA, BTDA-ODA, 6FDA-ODA, BTDA-BZD, DSDA-ODA, DSDA-ODA-6FAPB, and PMDA-ODA-6FAPB.

At step 520, the example system adds dianhydride to the solution. In some implementations, step 520 includes at least one of steps 522 and 524. At step 522, the example system adds pyromellitic dianhydride to the solution. In some implementations, example system adds pyromellitic anhydride according to a modified PI synthesis process. At step 524, the example system adds dianhydride to the solution at a 1.02:1 molar ratio of dianhydride to the solution. The method 500 then continues to step 530.

At step 530, the example system adds triphenyl phosphate to the solution. In some implementations, pre-mixing TPP/PI precursors during synthesis advantageously contributes to a homogeneous TPP distribution. It is to be understood that TPP is advantageous as a flame retardant material at least because it is halogen-free, low cost and an efficient and environmentally friendly flame retardants with a low melting point of approximately 48° C. This melting point of TPP can advantageously reduce response time in the event of a fire. In some implementations, a current collector cathode 110 or current collector anode 120 can maintain substantially the same cross-sectional thickness before and after incorporating TPP. In some implementations, the incorporation of TPP into PI significantly maintains a substantially equal mechanical strength compared to that of pure PI. As one example, for 25% TPP in PI-TPP films, 0.45 g TPP can be added. The method 500 then continues to step 540.

At step 540, the example system polymerizes the solution by heating. As one example, a reaction solution can be gradually heated to 180° C. and maintained for 2 h to complete polymerization. The method 500 then continues to step 550.

At step 550, the example system degasses the polymerized solution. In some implementations, the example system degases the polymerized solution for 5 minutes to remove substantially all gas in the solution. The method 500 then continues to step 560.

At step 560, the example system forms a polymer film from the polymerized solution. In some implementations, TPP solidifies within the PI when cooled to room temperature. In some implementations, step 560 includes at least one of steps 562 and 564. At step 562, the example system deposits the polymerized solution on a substrate. At step 564, the example system solidifies the polymerized solution by heating. As one example, heating can include imidization in a box furnace under air exposure to obtain a PI film. As another example, a temperature ramping can be: (1) ramp up from 25° C. to 100° C. at 3° C. min$^{-1}$; (2) maintain temperature at 100° C. for 30 min; (3) ramp temperature up to 200° C. at 3° C. min$^{-1}$; (4) maintain temperature at 200° C. for 30 min; and (5) cool down to room temperature in a furnace. In some implementations, the method 500 ends at step 560.

Figure 6:
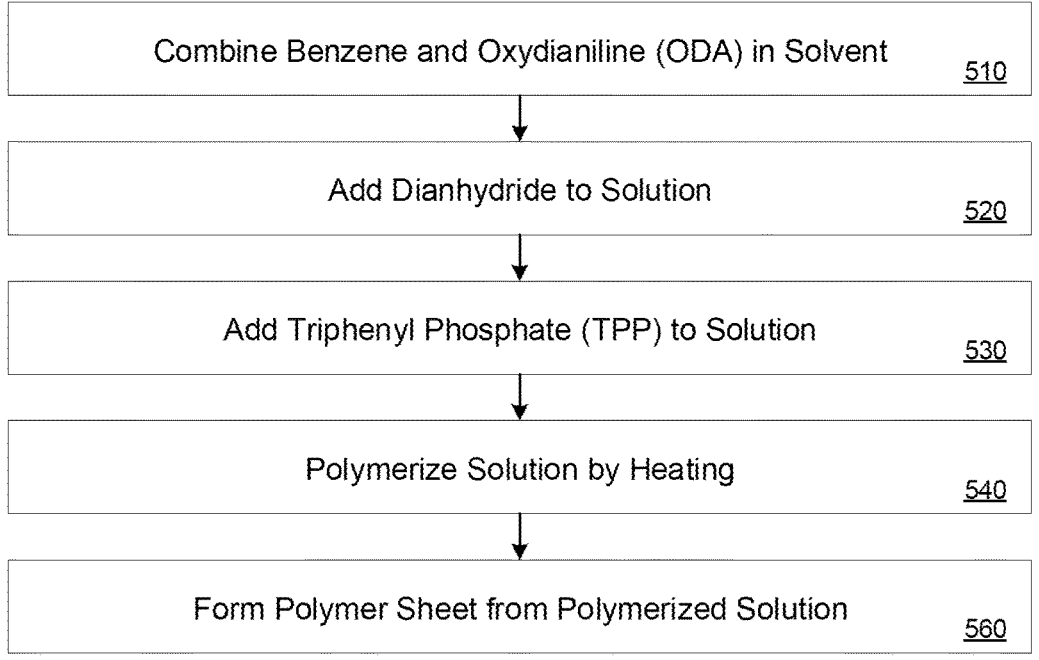
FIG. 6 illustrates a second example method of manufacturing a core layer of a current collector device, in accordance with present implementations.

FIG. 6 illustrates a second example method of manufacturing a core layer of a current collector device, in accordance with present implementations. In some implementations, at least a portion of the example device 100 is manufactured according to method 600 according to present implementations. In some implementations, the method 600 begins at step 510. At step 510, the example system combines benzene and oxydianiline in a solvent to form a solution. The method 600 then continues to step 520. At step 520, the example system adds dianhydride to the solution. The method 600 then continues to step 530. At step 530, the example system adds triphenyl phosphate to the solution. The method 600 then continues to step 540. At step 540, the example system polymerizes the solution by heating. The method 600 then continues to step 560. At step 560, the example system forms a polymer film from the polymerized solution. In some implementations, the method 600 ends at step 560.

Figure 7:
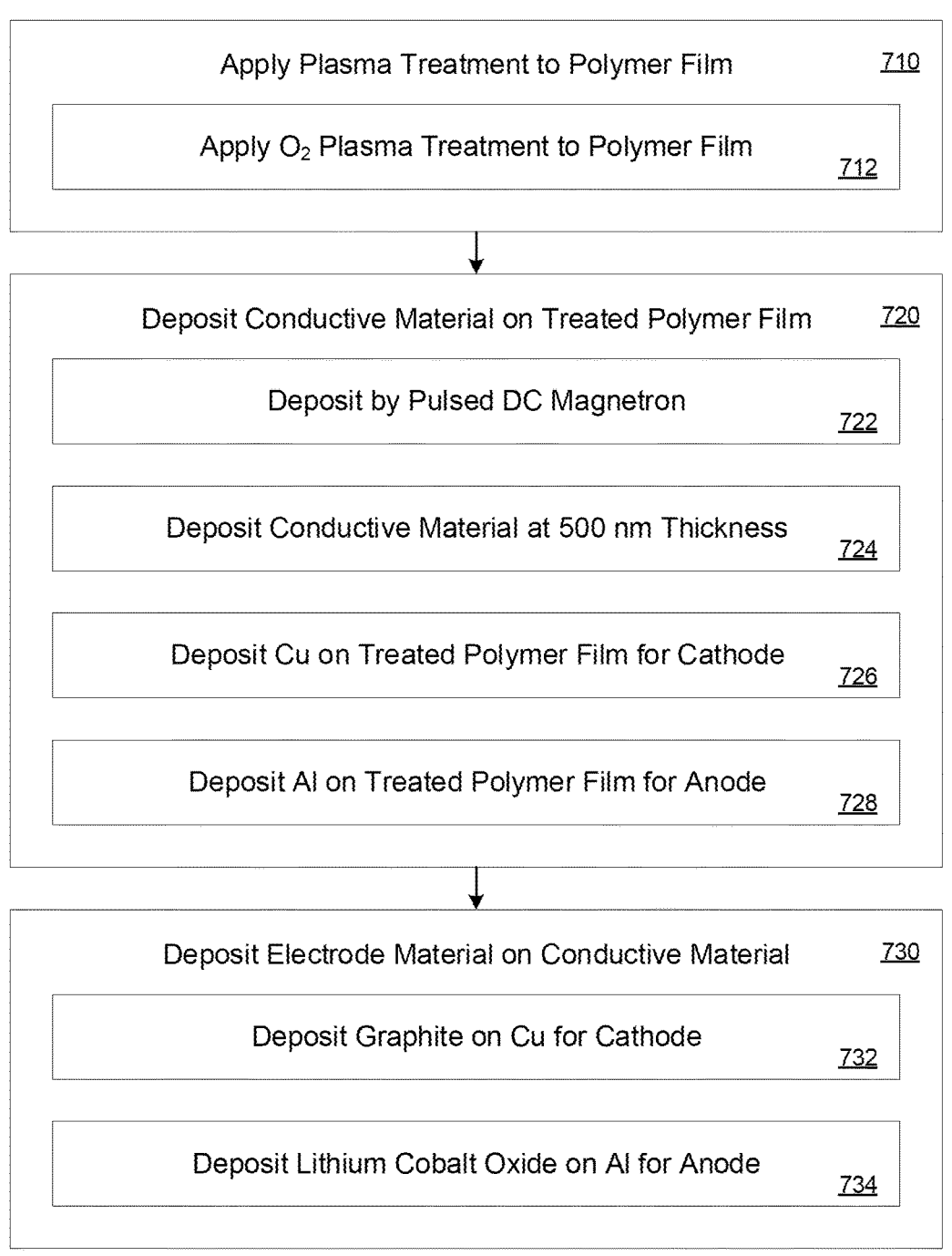
FIG. 7 illustrates a first example method of manufacturing a current collector device, in accordance with present implementations.

FIG. 7 illustrates a first example method of manufacturing a current collector device, in accordance with present implementations. In some implementations, at least a portion of the example device 100 is manufactured according to method 700 according to present implementations. In some implementations, the method 700 begins at step 710.

At step 710, the example system applies a plasma treatment to a polymer film. In some implementations, step 710 includes step 722. At step 722, the example system applies a molecular oxygen ($O_2$) plasma treatment to a polymer film. In some implementations, $O_2$ plasma to treat the supporting film renders the surface hydrophilic to enhance surface adhesion, and results in a graft of hydrophilic functional groups onto the surface. The method 700 then continues to step 720.

At step 720, the example system deposits conductive material on the treated polymer film. In some implementations, step 720 includes at least one of steps 722, 724, 726 and 728. At step 722, the example system deposits the conductive material on the treated polymer film by a pulsed direct current (DC) magnetron. As one example, using a magnetron sputtering deposition, one or more metallic layers (for instance, Cu) can be deposited on one or both sides of a core layer. It is to be understood that PI is a cost-effective material, and that deposition can be achieved by scalable methods including but not limited to electroless metal plating and sputtering. As another example, sputtering using a Cu target under a protective argon atmosphere can generate a 500 nm thick Cu layer, over a sputtering time of approximately 1,800 s. At step 724, the example system deposits conductive material at a thickness of substantially 500 nm. At step 726, the example system deposits copper on the treated polymer film. At step 728, the example system deposits aluminum on the treated polymer film. The method 700 then continues to step 730.

It is to be understood that in some implementations, a temperature modulating layer is deposited on a surface of the polymer film. In some implementations, the temperature modulating layer is disposed in contact with and sandwiched between two layers of polymer film. In some implementations, a nickel metal layer is deposited on the one side of a first polymer film as temperature modulation. Subsequently, another layer of polymer film can be coated on the opposite planar surface of the temperature modulating layer to prevent the temperature modulation from directly contacting to a metal layer. Thus, in some implementations, temperature modulation can be isolated by two insulated polymer films, advantageously preventing current leakage between a temperature modulating layer and a metallic layer during battery operation.

At step 730, the example system deposits electrode material on the conductive material. As one example, 2 cm$^2$ charge collector areas can be created by electrode deposition. In some implementations, step 730 includes at least one of steps 732 and 734. At step 732, the example system deposits graphite on deposited copper to form a cathode. At step 734, the example system deposits lithium cobalt oxide on deposited aluminum to form an anode. As one example, a fabricated PI-TPP-Cu charge collector can have a size of 8 cm×8 cm. In some implementations, the method 700 ends at step 730.

It is to be understood that charge collector devices in accordance with present implementations can advantageously provide self-extinguishing properties while maintaining electron/ion transport and minimizing reactions during normal charge-discharge cycles with self-extinguishing materials including PI and TPP.

Figure 8:
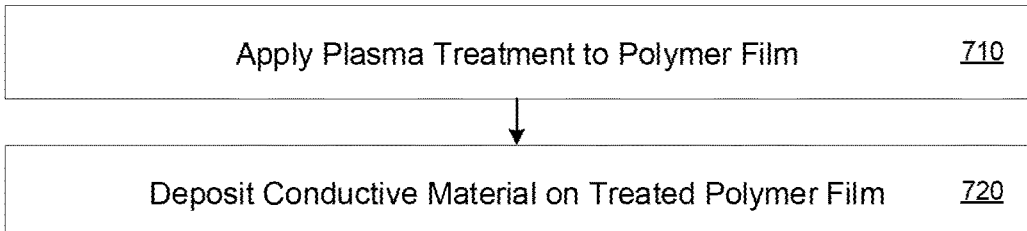
FIG. 8 illustrates a second example method of manufacturing a current collector device, in accordance with present implementations.

FIG. 8 illustrates a second example method of manufacturing a current collector device, in accordance with present implementations. In some implementations, at least a portion of the example device 100 is manufactured according to method 800 according to present implementations. In some implementations, the method 800 begins at step 710. At step 710, the example system applies a plasma treatment to a polymer film. In some implementations, step 710 includes step 722. At step 722, the example system applies a molecular oxygen ($O_2$) plasma treatment to a polymer film. The method 800 then continues to step 720. At step 720, the example system deposits conductive material on the treated polymer film. In some implementations, the method 800 ends at step 720.

The herein described subject matter sometimes illustrates different components contained within, or connected with, different other components. It is to be understood that such depicted architectures are illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Further, unless otherwise noted, the use of the words "approximate," "about," "around," "substantially," etc., mean plus or minus ten percent.

The foregoing description of illustrative implementations has been presented for purposes of illustration and of description. It is not intended to be exhaustive or limiting with respect to the precise form disclosed, and modifications and variations are possible in light of the above teachings or may be acquired from practice of the disclosed implementations. It is intended that the scope of the invention be defined by the claims appended hereto and their equivalents.

What is claimed is:

1. A current collector device comprising:
a first substantially planar metallic layer including a foil material; and
a first core layer having a first planar surface and including polymer and a fire retardant, wherein a first planar surface of the first metallic layer is disposed on the first planar surface of the first core layer,
wherein the current collector device comprising the first metallic layer and the first core layer is configured to have a mass loading of as low as 1.54 mg cm$^{-2}$.

2. The device of claim 1, further comprising:
a first electrode layer including an electrode material and disposed on a second planar surface of the first metallic layer opposite to the first planar surface of the first metallic layer.

3. The device of claim 1, further comprising:
a second substantially planar metallic layer including the foil material and disposed on a second planar surface of the first core layer opposite to the first planar surface of the first core layer.

4. The device of claim 3, further comprising:
a second electrode layer including the electrode material and disposed on a second planar surface of the second metallic layer opposite to the first planar surface of the second metallic layer.

5. The device of claim 1, wherein the first metallic layer has a thickness of 500 nm.

6. The device of claim 3, wherein the second metallic layer has a thickness of 500 nm.

7. The device of claim 1, wherein a weight percentage of the fire retardant to the polymer and the fire retardant is between 0 and 50 percent.

8. The device of claim 7, wherein the weight percentage of the fire retardant to the polymer and the fire retardant is 10 percent.

9. The device of claim 7, wherein the weight percentage of the fire retardant to the polymer and the fire retardant is 25 percent.

10. The device of claim 7, wherein the weight percentage of the fire retardant to the polymer and the fire retardant is 40 percent.

11. The device of claim 1, wherein a thickness of the current collector device is between 5 and 28 µm.

12. The device of claim 11, wherein the thickness of the current collector device is 5 µm.

13. The device of claim 11, wherein the thickness of the current collector device is 9 µm.

14. The device of claim 11, wherein the thickness of the current collector device is 18 µm.

15. The device of claim 11, wherein the thickness of the current collector device is 28 µm.

16. The device of claim 1, wherein the foil material comprises copper.

17. The device of claim 16, wherein the electrode material comprises graphite.

18. The device of claim 1, wherein the foil material comprises aluminum.

19. The device of claim 17, wherein the electrode material comprises lithium cobalt oxide.

20. The device of claim 1, wherein the polymer comprises at least one of polyimide, polyethylene terephthalate, polytetrafluoroethylene, poly (vinylidene fluoride-co-hexafluoropropylene), polyethylene, polypropylene, and polyetheretherketone.

21. The device of claim 1, wherein the fire retardant includes at least one of phosphorus, a halogen, silicone and nitrogen.

22. The device of claim 1, further comprising:
a temperature modulating layer having a first planar surface and including a temperature modulating material, wherein the first planar surface of the temperature modulating layer is disposed on a second planar surface of the first core layer.

23. The device of claim 22, further comprising:
a second core layer having a first planar surface and including polyimide and triphenyl phosphate, wherein a second planar surface of the temperature modulating layer opposite the first planar surface of the temperature modulating layer is disposed on the first planar surface of the second core layer.

24. The device of claim 22, wherein the temperature modulating material comprises nickel.

25. The device of claim 1, wherein the fire retardant has a lower density than the polymer.

26. The device of claim 1, wherein the current collector device comprising the first metallic layer and the first core layer achieves a specific energy equal to or greater than 400 Wh kg$^{-1}$.

* * * * *